United States Patent
Danielson

[15] 3,664,062
[45] May 23, 1972

[54] PLANT TRAY UNIT AND SHIPPING PACKAGE

[72] Inventor: Robert E. Danielson, West Chicago, Ill.
[73] Assignee: Geo. J. Ball, Inc., West Chicago, Ill.
[22] Filed: Sept. 29, 1970
[21] Appl. No.: 76,404

[52] U.S. Cl..............................47/34.13, 217/13, 217/27,
217/35, 206/46 FC, 206/46 PL, 47/DIG. 7
[51] Int. Cl..................................................A01g 9/02
[58] Field of Search............206/46 FC, 46 PL; 217/13, 27,
217/35; 47/34.11, 34.13

[56] References Cited

UNITED STATES PATENTS

| | | | |
|---|---|---|---|
| 152,758 | 7/1874 | Mills | 47/34.13 |
| 2,988,441 | 6/1961 | Pruitt | 47/DIG. 7 |
| 3,028,705 | 4/1962 | Howard | 47/34.13 |
| 3,273,779 | 9/1966 | Mykleby | 206/46 FC |

FOREIGN PATENTS OR APPLICATIONS

| | | | |
|---|---|---|---|
| 737,660 | 9/1955 | Great Britain | 47/34.13 |
| 722,589 | 11/1965 | Canada | 47/DIG. 7 |
| 1,341,968 | 9/1963 | France | 206/46 FC |

Primary Examiner—Robert E. Bagwill
Attorney—Dawson, Tilton, Fallon & Lungmus

[57] ABSTRACT

A plant tray unit for growing and shipping seedlings, cuttings, and the like, comprises a grid formed of rigid foam plastic, which provides a plurality of growing slots extending therethrough, the slots having sidewall portions converging upwardly and inwardly to restrict the upper portions of the slots for retaining plants and growth medium therein during handling and shipping. Separate plate means are provided for closing the bottom of the slots, which permits the grids to be filled with growth medium while in inverted condition, the bottoms attached, and the trays turned to their upright position for planting the seeds or cuttings. The tray units are adapted for incorporation in shipping package assemblies, the trays being enclosed in an outer carton, or forming sections of the package assembly.

5 Claims, 11 Drawing Figures

Patented May 23, 1972

INVENTOR:
Robert E. Danielson
BY
Dawson, Tilton, Fallon & Lungmus
Attys.

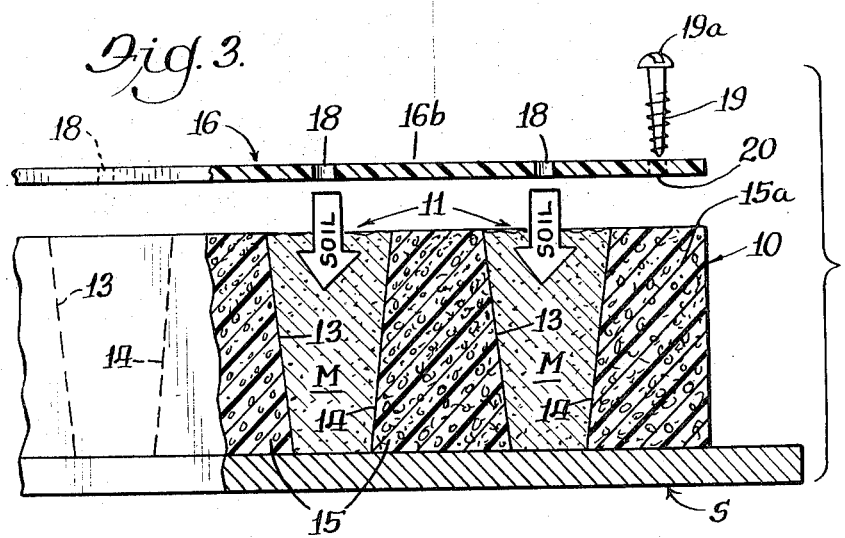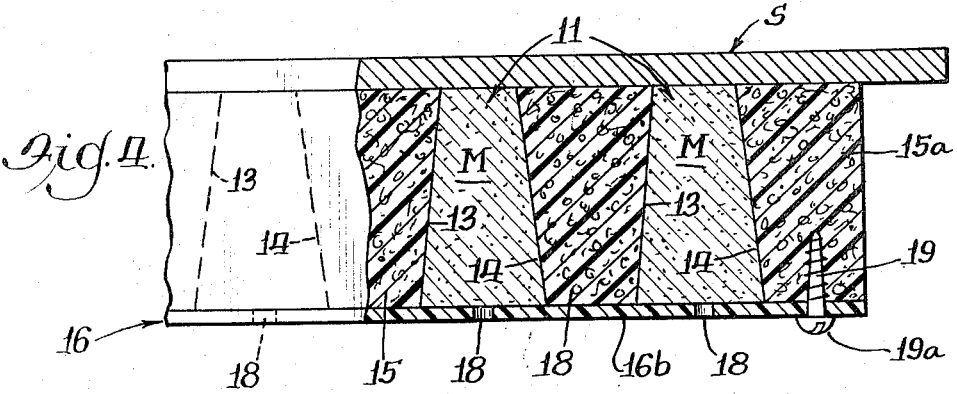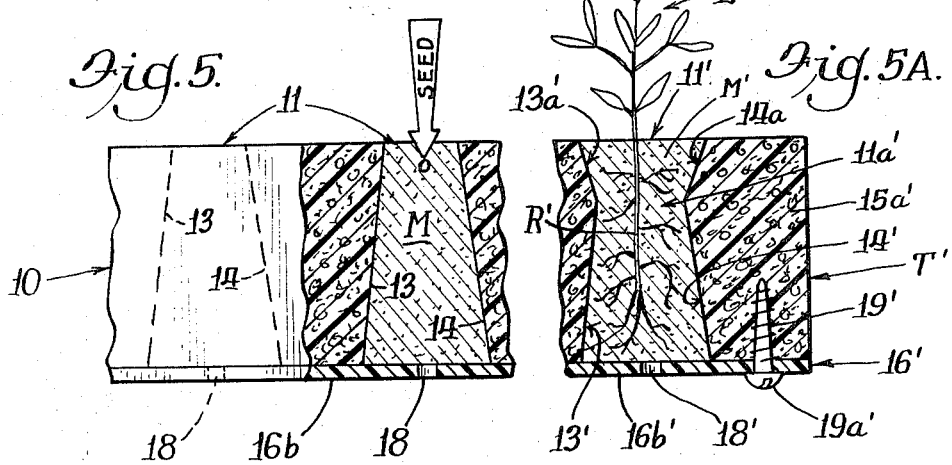

Patented May 23, 1972

INVENTOR:
Robert E. Danielson
BY
Dawson, Tilton, Fallon & Lungmus
Attys.

INVENTOR:
Robert E. Danielson
BY
Dawson, Tilton, Fallon & Lungmus
Attys.

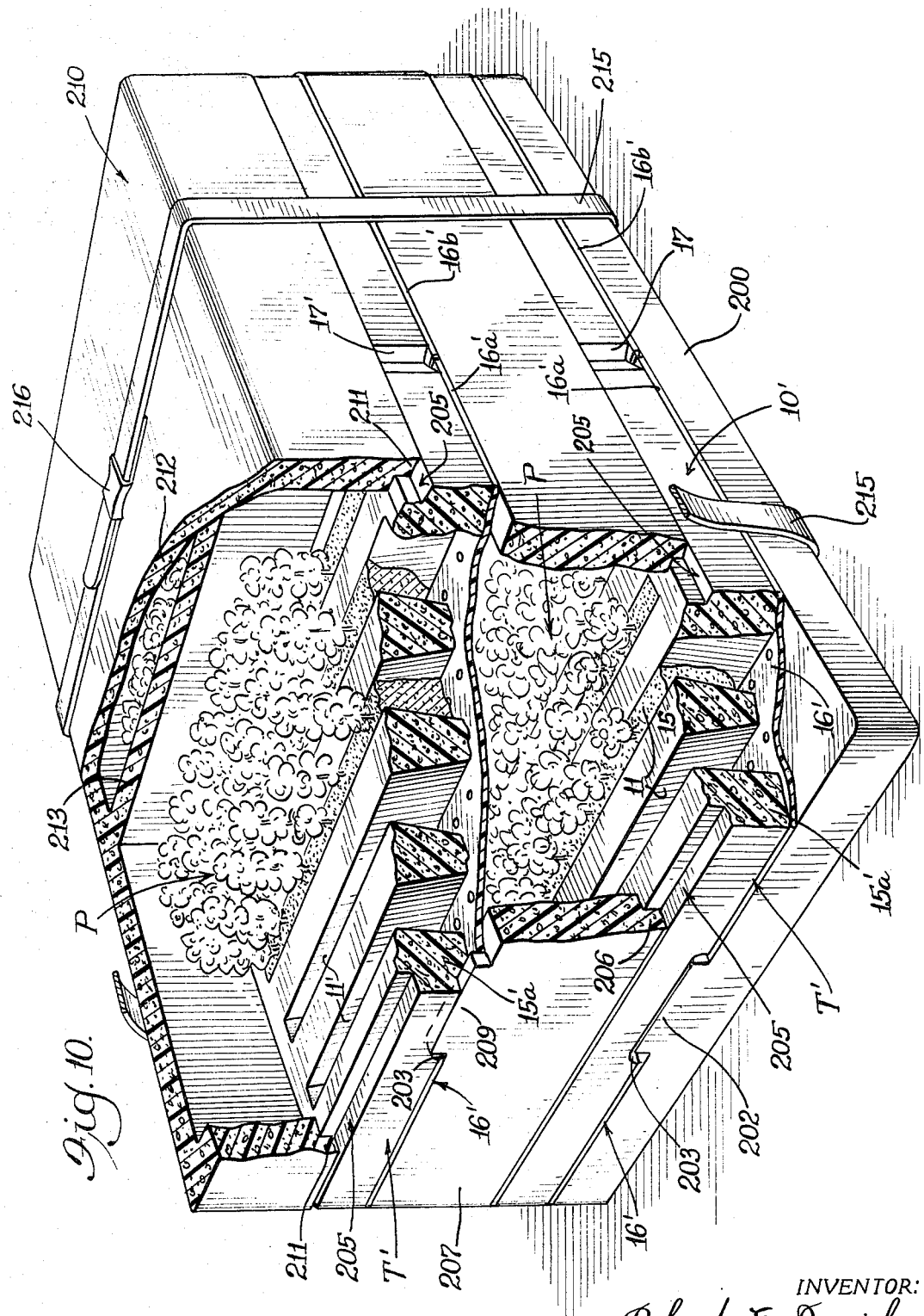

PLANT TRAY UNIT AND SHIPPING PACKAGE

BACKGROUND AND SUMMARY

In the United States, retail greenhouses commonly start their own plants from seed, and then transplant the seedlings into retail containers where they are grown to market size. This is an expensive and time consuming procedure, because of the hand labor involved, the failure of a certain percentage of the seeds to germinate, and the need to start the seeds many months before the plants are ready for market. From the standpoint of retail greenhouses, it would be much more efficient to purchase seedlings from large wholesale greenhouses. The plants would already be started, and ready for transplanting into retail size containers, and the holding time to reach market size would be greatly reduced.

However, the growth and shipment of seedlings on a wholesale basis has been limited and relatively unsuccessful because of handling problems and damage losses to the seedlings during shipment. When the seedlings are shipped by mail, or other rail or truck shipping service, the packages are subject to shocks, jars, and handling which can dislodge or damage the seedlings. Despite markings on the packages requesting that they be maintained "right side up," or similar legend, this can not be assured. The tipping or even complete inversion of the packages can and does occur during shipment, and this can easily cause the plants to become dislodged and damaged. Heretofore, some packages have been developed for protecting certain plants in shipment, but these have either not been adapted to use with seedlings, or they have proven too expensive for use in the growing and shipping of seedlings.

A similar problem exists with respect to the production of plants from cuttings. In the case of flowers, such as chrysanthemums, the cuttings may be made from field grown plants in Florida or California, and shipped to a central wholesale greenhouse for rooting. After the cuttings have been rooted, the practice has been to remove them from the containers in which they were rooted, and package them for shipment to retail greenhouses. This has required considerable handling labor, and the rooted cuttings have been subject to damage and loss in shipment. There has been a need for an improved shipping container for such rooted cuttings, especially a shipping container that can also be used as a growing tray, thereby making it unnecessary to remove or handle the rooted cuttings prior to packaging and shipment.

The present invention meets the needs described above, and substantially overcomes the problems and difficulties associated with the growing and shipping of seedlings, cuttings, and the like. A novel plant tray unit is provided, which can be used both as a growing tray and as a shipping container. The tray unit is adapted for incorporation in a shipping package or package assembly, which will securely hold the plants in place, preventing damage during transit, even if the containers are inverted so that the plants are hanging downwardly. The tray unit of this invention is also adapted for a novel filling procedure, the growth medium being introduced into the bottoms of the containers, so that the subject matter of this application also relates to a method of growing plants for shipment. The novel and inventive features of the plant tray units, the method of growing plants therein for shipment, and the shipping packages or assemblies prepared therefrom will be fully disclosed in the following detailed specification.

THE DRAWINGS

Preferred embodiments of the subject matter disclosed and claimed herein are shown in the accompanying drawings, wherein FIG. 1 is a perspective view of a plant shipping package, the outer carton being partially broken away to show the plant tray units of this invention;

FIGS. 3–5 are fragmentary sectional elevational views illustrating the sequence of steps in filling the tray unit of FIG. 2 with a growth medium and planting seeds therein;

FIG. 5A is a view similar to FIG. 5, illustrating a modification of the cross-sectional shape of one of the growth medium receiving slots;

FIG. 10 is a perspective view of another package assembly, the package being partially broken away to illustrate the components thereof.

DETAILED DESCRIPTION

For the purpose of orientation, attention is first directed to FIG. 1, which illustrates a complete shipping package including two tray units T with plants P therein, the constructional details of which will now be described.

Figure 2:
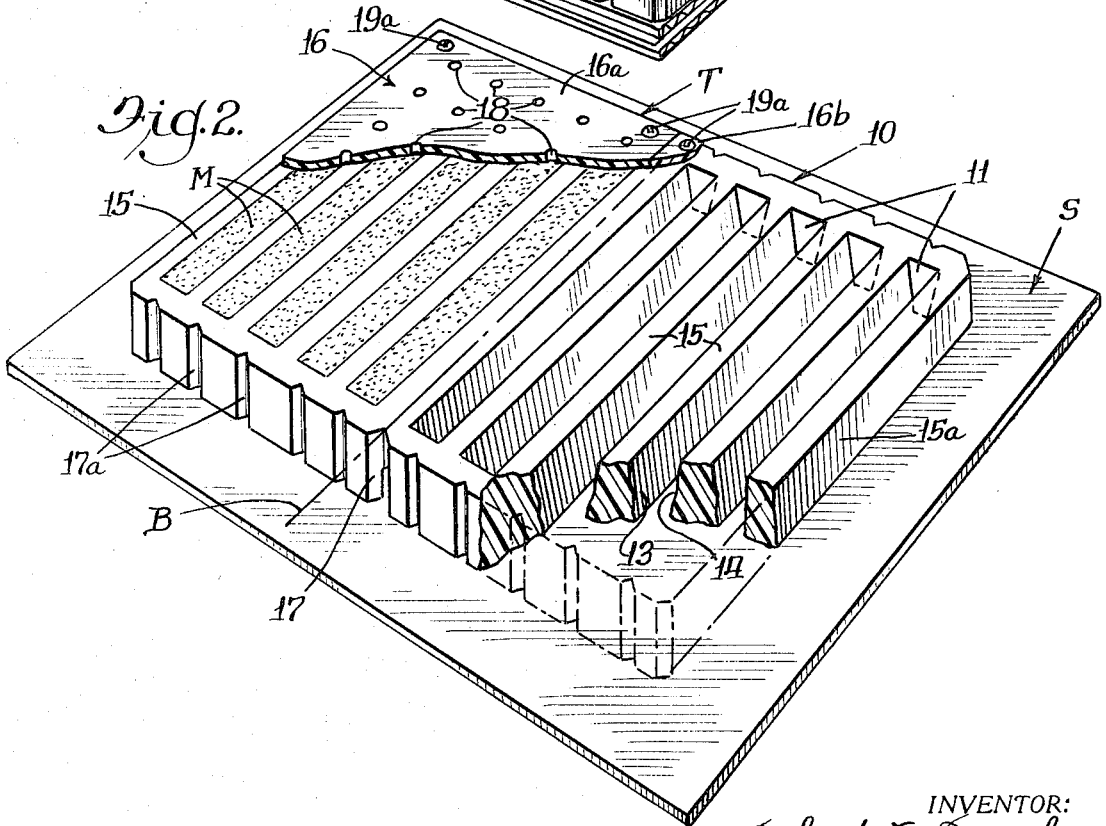
FIG. 2 is a perspective view of one of the tray units of FIG. 1, the tray unit being shown in inverted position, and part of the bottom being broken away.

In FIG. 2, the tray unit T is shown in inverted condition with its bottom uppermost and its top resting on an invertable support sheet or pallet S. The tray unit includes, as its main component, a horizontally extending grid 10. Grid 10 can be formed in one piece, or in several sections. The grid means is advantageously formed of a rigid foam plastic, such as a rigid polystyrene plastic foam. For example, the material can be "-Styrofoam," which is a trademark of Dow Chemical Company for its rigid polystyrene foam material. The grid 10 can be formed of other rigid plastic foams, such as foamed phenolic resins, or foamed polyurethane plastic. Preferably, grid 10 is molded integrally, that is, in one piece, from polystyrene foamed by means of a gaseous blowing agent to produce a substantially sealed cellular structure of rigid foam material. The plastic foam material of the grid means does not need to be porous or water-absorbent, and is preferably substantially non-porous and water-impervious.

Grid 10 provides a plurality of elongated growing cells or slots 11 extending through the grid from the bottom (shown upwardly in FIG. 2) to the top (shown downwardly). As shown, the slots are horizontally elongated relative to their width at the top or bottom and relative to their vertical depth, being several times longer than any of their other dimensions. As shown more clearly in FIGS. 2 to 5, the slots 11 have opposed or facing sidewalls 13 and 14 which extend the length of the slots, and converge upwardly and inwardly relative to each other from the bottom toward the top thereof. Where the tray unit T is shown in its normal upward orientation (see FIGS. 4 and 5), the convergence of the sides 13, 14 provides a cross-sectional restriction toward the upper portion of the slots. In the preferred embodiment shown, the sides 13, 14 converge uniformly from their bottom ends to their top ends, thereby giving the open tops of the slots the narrowest cross-section, while their bottom ends have the greatest width or cross-section.

In the embodiment of FIGS. 2 to 5, the slots are arranged in generally parallel side-by-side alignment. The slots are separated and bounded by bar portions 15, 15a of the grid. The end bars 15a have vertical outer walls, and are thereby of a slightly different cross-sectional shape from the inner bars 15, but the configuration of the end slots remains the same. The outside shape of the grid means 10 is preferably generally rectilinear, and the slots 11 are arranged with their longitudinal axes generally perpendicular to one pair of the sides of the grid, and generally parallel to the other pair of grid sides.

The tray unit T includes a separable closure means bottom cover, which preferably is in the form of flat panels or plates attached by suitable means to the bottom of grid 10. In the embodiment of FIGS. 2 to 5, the bottom closure, designated generally by the number 16, includes two plate or panel sections 16a, 16b. Plate means 16 can be formed in one piece, but the sectionalized construction has the advantage of permitting the tray units to be separated into sub-tray units for retail sale, such as along the broken line B as shown in FIG. 2. To assist in this separation, wedge shaped indentations 17 can be provided (see FIG. 6).

The bottom cover or plate means 16 is preferably formed of a water-impervious, or at least of a water-resistant material. Thermoplastic sheet materials can be used, such as polyethylene, polypropylene, or polyvinyl-acetate plastics. Plate means 16 can be formed of water-resistant fibrous sheet materials, such as asphalt-impregnated paperboard.

To provide for drainage, the plate sections 16a, 16b are provided with perforation 18. As shown, the perforations 18 can be arranged in rows extending across the tray, one row being in alignment with the bottom ends of each of the slots 11.

Means are provided for attaching the bottom plate means, (viz. the plate section 16a, 16b) to the grid 10, such as screw attachment means, adhesive attachment means, etc. As indicated in FIG. 2, and shown more clearly in FIGS. 3 and 4, ordinary metal screws 19 can be used for this purpose, the screws being extended through openings 20 in the panel sections 16a, 16b, with the threads engaging the foam plastic material of the grid. With this construction, the novel filling procedure illustrated in FIGS. 3 to 5 can be employed. For accomplishing the objects of the present invention, the slots 11 of the trays T should decrease in cross-section from their lower to their upper portions. The purpose of this converging constructure is to assist in retaining the growth medium with the rooted seeds and cuttings during handling and shipment. However, since the tops of the slots, although open, are relatively narrow and of restricted cross-section, it is difficult to fill the slots completely and uniformly with a growth medium, such as a mixture of soil, sand, and peat moss. By making the bottom cover separate and removable and using the filling procedure illustrated in FIGS. 3 to 5, this disadvantage can be overcome. In fact, the filling of the slots with the growth medium is more easily accomplished by introducing the growth medium into the enlarged bottom ends of the slots.

To facilitate the filling and manipulation of the trays T, they can be placed on movable pallets or sheets S. It will be understood that the pallets S will be resting on a suitable horizontally extending support surface, such as a table. With the bottom covers removed, or even more advantageously, before the initial attachment of the bottom covers, the grids 10 are placed on the pallets S in inverted condition with the enlarged bottom ends of the slots 11 facing upwardly. The top ends of the slots thereby face downwardly and are temporarily closed by the adjacent surfaces of the pallets S. Soil or other plant growth medium M is filled into the open bottoms of the slot, as indicated in FIG. 3. After the slots have been substantially completely filled with the growth medium, the bottom covers, or the sections thereof, are attached to close the lower ends of the cells or slots while in the inverted position. Various attachment means can be used, but ordinary machine screws are suitable. The screws 19 are inserted at the four corners of each panel section, as indicated more clearly in FIG. 2. By inserting the screws with their heads 19a projecting beyond cover 16 another function is performed. When the assembled tray units are placed on a flat supporting surface, as they may be during the growth of plants therein, the screw heads 19a act as spacers, holding the drainage perforations 18 slightly above and out of contact with the supporting surface. This facilitates drainage of excess water from the growth medium.

After the attachment of the bottom closure means, such as the cover plate means 16, the filled containers are turned over while holding the pallet against the tops of the slots or plant cells to retain the growth medium therein. The pallet is then removed. This handling method is illustrated by FIGS. 3 and 4. After the slots or plant cells 11 have been filled with the growth medium M through their open bottoms, as indicated in FIG. 3, and the bottom closure means 16 has been attached across the lower end of the slots or plant cells to close the bottom of the container while remaining in a bottom-upward position, the movable pallet S is held against the inverted top of the container and the container is turned or flipped over to the position of FIG. 4. Pallet S is then removed, and the container is ready for the planting of seeds or cuttings. FIG. 5 diagramatically illustrates the planting of seeds in the slots of a filled container through their open tops.

While the medium M can fall out of the slots 11 after it is first introduced therein, if the trays T are tipped or inverted, it has been found that the strips of the growth medium M within each slot becomes integrated during the growth of plants therein, the plant roots extending laterally and longitudinally within the slots throughout the growth medium. After the seedlings or cuttings are well rooted and ready for shipment to retail growers, the soil medium and plants are retained securely within the slots during handling and shipment. An important factor is the wedging or dove-tail action of the slots.

It will be appreciated that variations in the cross-sectional shape of the slots 11 and in the form of the walls 13, 14 are possible, while still achieving the objects of this invention. For example, the desired convergence in an upward direction can be obtained by having only one of the walls incline upwardly and inwardly. Moreover, reference is made to FIG. 5A, which illustrates another modification of the shape of the grid slots. For convenience of reference, similar elements are given the same numbers except that the numbers are primed to indicate that the figure represents a modification. As there shown, the slot 11' is provided by upwardly and inwardly inclining wall portions 13', 14', which narrow to the restricted portion 11a'. Above restriction 11a', slot 11' enlarges slightly due to the outward inclination of the side portions 13a' and 14a'. From the standpoint of providing maximum security against dislodgment or damage of the plants in handling or shipping, the design of slot 11' is not quite as desirable as that of the previously described slots 11. However, when the seedlings or cuttings are rooted within the slots 11' and the growth medium M' has been united by the roots R' of the seedlings or other plants L', the advantages of the present invention can be substantially obtained. The slot configuration of FIG. 5A has the further advantage that if necessary the slots can be filled with the growth medium through their open tops. This can permit the pre-assembly of the bottom covers 16' to the trays T', if desired.

Figure 1:
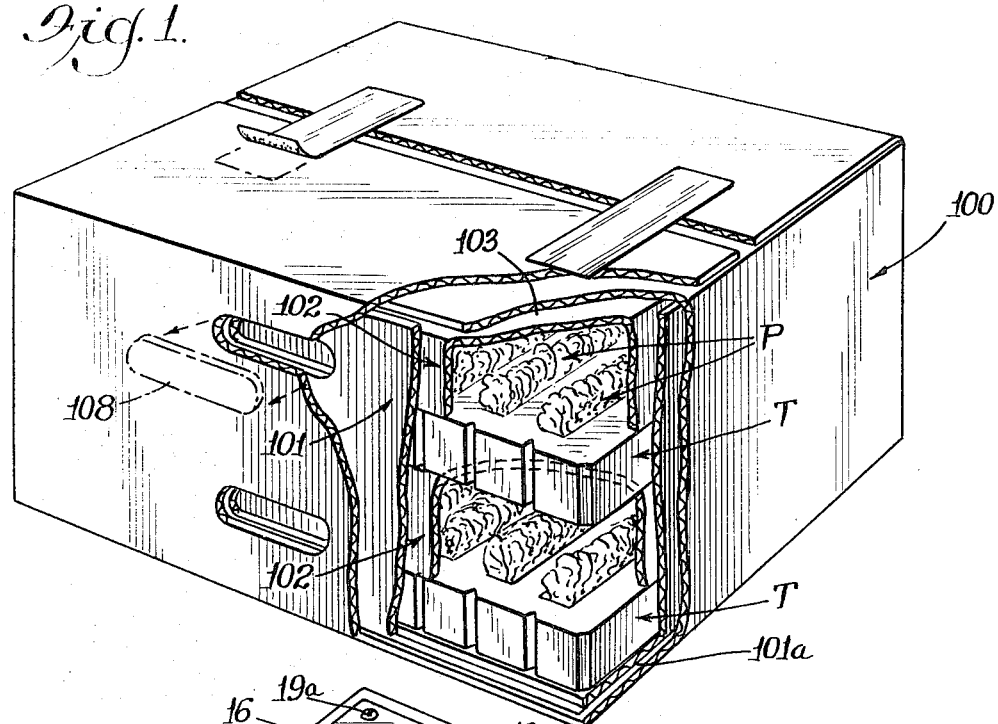
Figure 6:
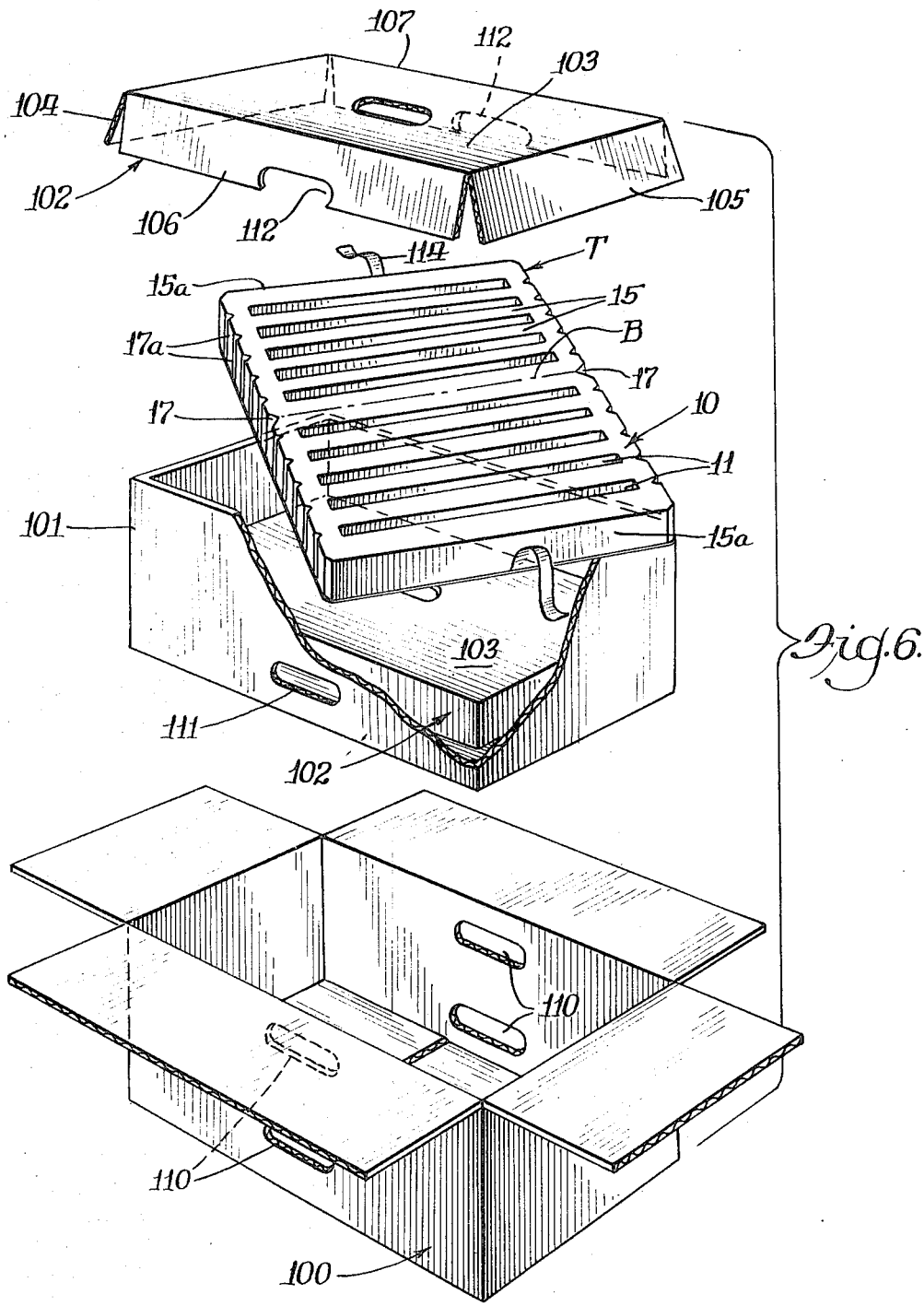
FIG. 6 is an exploded perspective view of the shipping package of FIG. 1.

Referring now to the plant shipping package of FIG. 1, and to the exploded showing of the contents thereof in FIG. 6, it can be seen how the tray units T are adapted for incorporation in complete plant shipping packages. A convenient and safe means is thereby provided for shipping seedlings, cuttings, and the like, such as the plants P shown in FIG. 1.

In the package embodiment of FIGS. 1 and 6, the package includes a rectilinear outer carton 100, which is formed of corrugated paperboard, and provides the usual top and bottom closure flaps for such paperboard boxes. To reinforce box 100, and also to provide temperature insulation, a perimetric liner 101 can be provided, and the liner may also be formed of corrugated paperboard. In this embodiment, the carton means includes the box 100 and the liner 101, and together enclose the shipping space which receives the tray units T.

Packages of the kind just described will include one or more of the plant trays T arranged to extend horizontally therein, when the shipping container is in its normal upright position. In the illustration shown in FIGS. 1 and 6, the package includes two of the tray units and is adapted for shipping seedlings, such as begonia seedlings, petunia seedlings, etc. The lower tray T, as shown in FIG. 1, can rest on the top of the bottom panel 101a of liner 100. Retaining means are provided for holding the tray units in a fixed position within the shipping space. In the illustration given, the retaining means is in the form of a spacer 102, the construction of which are shown more clearly in FIG. 6. As shown, the spacers 102 are formed from corrugated paperboard and have horizontally extending top surfaces 103, end panels 104, 105, and side panels 106, 107. The side panels are folded downwardly in alignment with the adjacent sides of liner 102, and have their lower ends resting on top of the grids 10 of the tray units T. It will be understood that the height of the side panels of spacer 102 will be dimensioned to provide adequate space for the tops of the plants, as indicated in FIG. 1. Preferably, as shown, the upper tray unit T rests on the top panel 103 of the lower spacer 102. Thus, the spacer 102 between the two trays T not only serves to hold the lower of the tray units T in position but also provides the means for supporting the upper tray unit. Another spacer 102 retains the upper tray unit with its lower edges bearing against the top of the grid 10. When the top flaps of the outer box 100 are closed and sealed, as indicated in FIG. 1, the closed flaps bear against the top panel 103 of the upper spacer 102, thereby locking the entire assembly together, and providing a secure shipping package.

Figure 8:
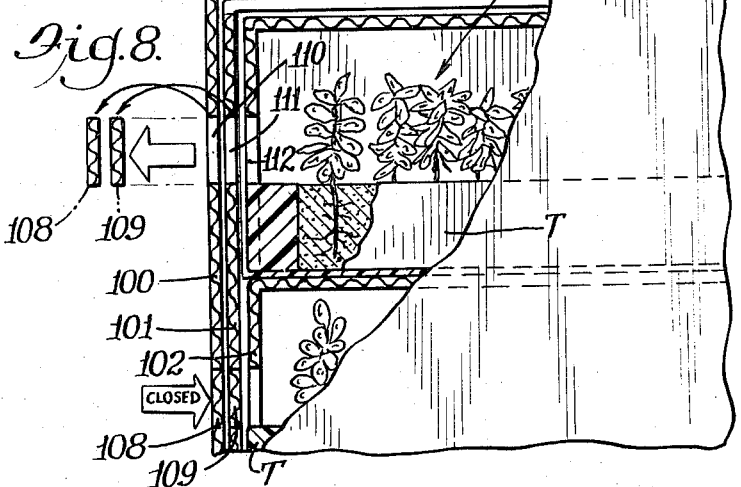
FIG. 8 is a fragmentary elevational view of the shipping package of FIGS. 1 and 6, partially broken away to illustrate the ventilation knock-outs.

The relationship of the components of the package P of the completed assembly are shown in FIG. 8, which also illustrates the removable knock-outs. For shipment in summer, especially on very hot days, it is desirable to have ventilation openings for the package. In the winter or on colder days, however, it is desirable to insulate the interior of the package from the outside atmosphere, thereby protecting the plants against damage from cold or freezing temperatures. These functions can readily be accomplished by providing the box 100, and the liner 101, with removable knock-outs 108, 109. The knock-outs can be die-cut sections of the carton, as shown, which can be left in place, or removed to provide aligned openings 110, 111. The side panels 106, 107 of the spacers 102 can be provided with aligned openings 112. Removable knock-outs can be provided for the openings 112, but this is not required, since with the knock-outs 110, 111 in place, adequate insulation will usually be provided.

When the shipping container reaches its destination, the top flaps of box 100 are opened, upper spacer 102 removed, and the upper tray T with plants P is ready for removal. To facilitate the lift-out, a tape 114 running under the bottom of the tray unit T and having lifting ends, as shown more clearly in FIG. 6, can be grasped with the hands to remove the tray T from its snug fitting relation with the liner 101.

Figure 7:
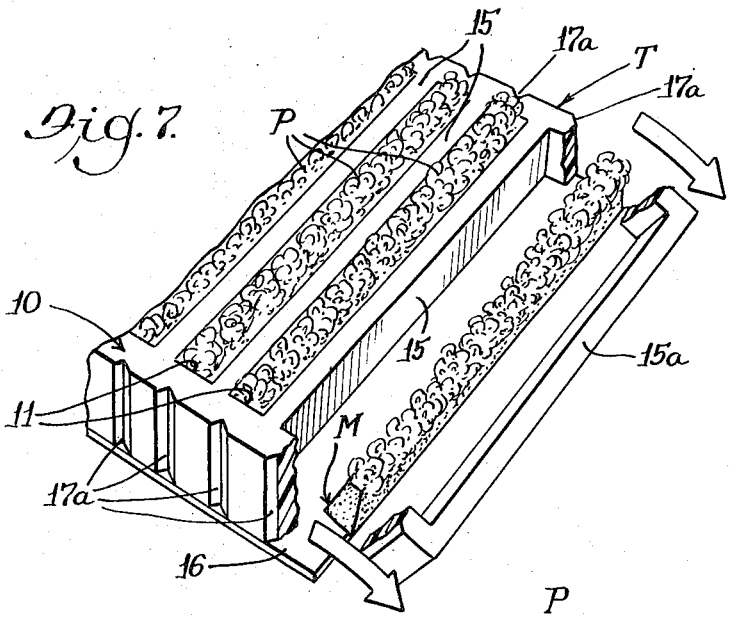
FIG. 7 is a fragmentary perspective view of an end portion of one of the tray units of the preceding figures, the view illustrating an optional breakaway feature for the foam plastic grids.
Figure 9:
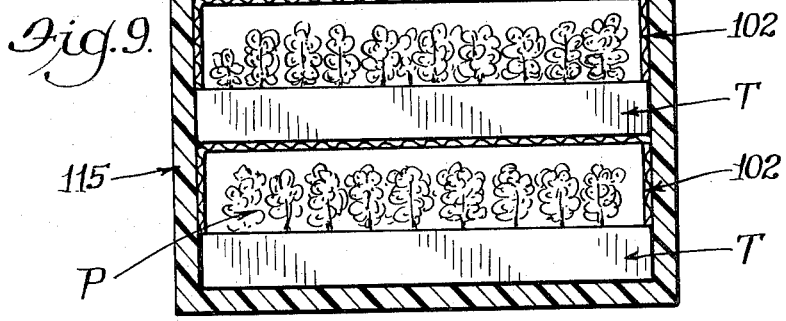
FIG. 9 is a sectional view illustrating a modification of the shipping package of FIGS. 1 and 6.

The seedlings can be removed from the trays T, as illustrated in FIG. 7. The bar portions 15, 15a of the tray unit can be cut or broken away one at a time to free the rows of plants P in the growth medium M. The freed plants can still be resting on top of the bottom plate 16 as indicated in FIG. 7. To facilitate the cutting or breaking through of the outer walls of the grid 10 in alignment with each of the rows of plants, V-shaped indentations can be provided, such as the vertically extending recesses 17a. When such recesses are provided, the bar portions 15 can be broken away one by one without the use of any special tools. This feature, however, is not essential, since a knife can also be readily used to cut through the foam plastic material of the grid.

Where greater protection of the plants during shipment is desired, and especially for shipment under cold weather conditions, the outer carton can be formed of a rigid plastic foam material. The desirable foam plastic materials for this purpose are the same as those described above for use in forming the grids 10. One form of such a shipping package or container assembly is shown in FIG. 9. The box 100 and interliner 101, described in respect to the embodiment of FIGS. 1 and 6, have been replaced with a box member 115 molded from rigid foam plastic material, the box having a removable top or cover 116. As shown, the lower tray T sits on top of the inside of the bottom of the box 115, and is held in position by the lower spacer 102 which also supports the upper tray T. An upper spacer 102 is used to maintain the position of the upper tray, the underside of the lid 116 bearing against the top of the upper spacer. The completed package can be held together by strap or band means extending around the outside of the package, as illustrated with respect to the embodiment of FIG. 10, which will now be described.

In the plant shipping container assembly of FIG. 10, the trays T' are utilized to form part of the exterior wall of the completed shipping package, and mating or nesting components formed of a rigid plastic foam material are provided for use therewith. It will be understood that the desirable plastic foam materials are the same as those previously described for use with the grids 10. As shown in FIG. 10, there can be provided a separate generally flat bottom panel 200 formed of the rigid plastic foam. This member is in the form of a flat sheet or panel, except that its ends can be provided with upwardly extending flanges or tab portions 202 for interlocking with corresponding recesses 203 in the bottom of the tray units T'. As shown, the recesses 203 extend through the panels 16a', 16b' of bottom 16' and upwardly into the end bars 15a'.

The tray unit T' as shown in FIG. 10 are further modified in that the breakaway grooves 17a are omitted, although the central separation notches 17' are retained. As previously explained, the bars 15 can be progressively broken away by using a knife to cut through the side portions of the grid 10. The peripheral portions of the grid 10 are also modified by providing an offset or notch 205 around the outer edge portion thereof. As shown in FIG. 10, the top of the lower tray unit T is enclosed by a perimetric spacer 207 also formed of rigid foam plastic. Spacer 207 is provided with a downwardly extending flange portion 206 which seats in and is received by the notch 205. The ends of spacer 207 are provided with upwardly extending tab portions 209 which are received in the recesses 203 beneath the upper tray T'.

A top enclosure 210 also formed of rigid foam plastic material is seated on top of the upper tray T'. The downwardly extending walls of enclosure 210 are provided with a downward extending rib or flange portion 211 which is received within and mates with the notch 205 around the upper periphery of the tray T'. The top enclosure 210 can be molded in one piece with an integral top 212, and, if desired, a central reinforcing divider 213.

It will be understood that the spacer 207 and the upper tray T' can be omitted. In this case, the top enclosure 210 will be seated directly on the lower tray T' forming a package having only one tray therein. Generally stated, therefore, the container assembly should have at least one of the tray units, and should include separate enclosure means formed of a rigid plastic foam material enclosing the top of the tray unit while providing a space thereabove for the tops of the plants growing in the tray unit. Preferably, all of the components of the package, such as the bottom panel 200, the tray units T', the spacer 207, and the top enclosure 210 should have approximately the same outside dimensions. When these components are assembled, such as in the manner of FIG. 10, they will therefore form a package with relatively flat and aligned outer wall portions.

Although not essential, it is preferred to provide interlocking flange and groove means to limit the relative lateral movement of the components of the package assembly, such as the assembly of FIG. 10. As already described, such interlocking flange and groove means include the tabs 202 with the slots 203, the notches 205 with the flanges 206, the tabs 209 with the the slots 203, and the notches 205 with the flanges 211. Some or all of these can be omitted, although the construction shown is advantageous.

For uniting the components of the package assemblies, such as the assembly of FIG. 10, banding means can be provided encircling the assembly and holding the components securely together. For example, as shown in FIG. 10, two straps or bands 215 are provided, the bands being drawn tightly about the exterior of the assembly, and the overlapping ends of the bands being secured by clamps 216. The straps 215 can be formed of metal or other suitable banding material, such as plastic reinforced fiberglass straps. If desired, one or more of the bands 215 can also be used to encircle the assembly in the other direction, although this will usually not be necessary. It will be appreciated that the bands 215 will encircle the assembly formed by the bottom panel 200, the tray T' and the top enclosure 210 either alone or with an intermediate second tray T' and the spacer 207. Moreover, the assembly components illustrated in FIG. 10 can be used to form packages having more than two trays. For example, an additional spacer 207 and tray unit T' can be used to provide additional plant holding levels, and the top of the package finally closed by the top cover 210. It will be appreciated that this provides a plant shipping package of highly flexible size and capacity.

In what has been disclosed in the foregoing, it will be appreciated by those skilled in the art that the tray units can be made in various sizes, and that the size and shape of the slots in the grids can be varied, depending on the type of plants to be grown and shipped, and for other reasons. For seedlings, it has been found satisfactory to form the grids from a rigid polystyrene plastic. While the dimensions are not critical, the grids can conveniently have a thickness of about 1 ½ inch. The slots 11 can conveniently have a width at their upper ends of ½ inch, and widening to a width at their bottom ends of seven-eighths inch. When the slots 11 have this configuration, it has been found that the seedlings can be grown and shipped without becoming dislodged and damaged during shipment.

I claim:

1. A plant tray unit for growing and shipping seedlings, cuttings, and the like, comprising horizontally extending grid means formed of rigid foam plastic material, said grid means providing a plurality of horizontally elongated growing slots which extend vertically through said grid means from the top to the bottom thereof, said slots having a horizontal length at least several times their vertical depth, said slots also having opposed sidewall portions converging upwardly and inwardly relative to each other and providing a cross-sectional restriction toward the upper portion of said slots for retaining therein plants rooted in a growth medium, and plate means formed of a separate material from said grid means, said plate means extending across and closing the bottoms of said slots and being attached to said grid means.

2. The plant tray unit of claim 1 in which said slots are arranged in generally parallel side-by-side alignment, and said slots are separated by bar portions of said grid means, said bar portions providing said slot sidewall portions.

3. The plant tray unit of claim 1 in which each of the said opposing sidewall portions incline upwardly and inwardly from the lower ends to the upper ends of said slots, whereby said slots have their smallest cross-section at the top of said grid means.

4. The plant tray unit of claim 1 in which said grid means has generally rectilinear sides, and said slots are arranged side-by-side with their longitudinal axes substantially perpendicular to the one pair of opposite sides of said grid means and generally parallel to the other pair of sides thereof.

5. The method of growing plants for shipment, such as seedlings, cuttings, and the like, characterized by the steps of:
 a. providing container means having a plurality of open-topped growth cells decreasing in cross-section from the lower to the upper portions thereof, and including separable closure means for the lower ends of said cells;
 b. positioning said container means in inverted position on a movable pallet with said closure means removed, the tops of said cells being downward and temporarily closed by said pallet and the bottoms therein being upward and temporarily open;
 c. filling said cells with a growth medium through said open bottoms;
 d. attaching said closure means across the lower ends of said cells to close said bottom while in said upward position; and
 e. preparing the filled container means for planting by turning the container means over while holding said pallet against the tops of said cells to retain said growth medium therein, and thereafter removing said pallet.

* * * * *